United States Patent [19]
Handley

[11] Patent Number: 5,575,120
[45] Date of Patent: Nov. 19, 1996

[54] DESIGN AND CONSTRUCTION MODULE

[76] Inventor: Frederick G. Handley, 1181 Pelissier Street, Windsor, Ontario, Canada, N9A 4M1

[21] Appl. No.: 466,106

[22] Filed: Jun. 6, 1995

[51] Int. Cl.$^6$ .............................. E04B 1/348; E04H 1/00
[52] U.S. Cl. .......................... 52/79.1; 52/79.4; 52/236.4; 52/603; 52/604; 52/609; 52/745.2; 52/747.1; 446/124; 446/125
[58] Field of Search ................................. 52/79.1, 79.4, 52/236.4, 603, 604, 609, 745.2, 747.1; 446/124, 125

[56] References Cited

U.S. PATENT DOCUMENTS

| | | |
|---|---|---|
| 1,894,605 | 1/1933 | Wright . |
| 2,082,457 | 6/1937 | Martinichio . |
| 3,546,792 | 12/1970 | Sherman . |
| 3,643,390 | 2/1972 | Shelley . |
| 3,739,541 | 6/1973 | Andrews . |
| 4,121,397 | 10/1978 | Marcocci et al. . |

FOREIGN PATENT DOCUMENTS

| | | |
|---|---|---|
| 1070750 | 2/1954 | France . |
| 291328 | 5/1928 | United Kingdom . |
| 590291 | 7/1947 | United Kingdom . |

OTHER PUBLICATIONS

The Toshi–Jutaku—Jun. 1970.
The Japan Architect: International Edition of Shinkenchiku—Jun. 1975.
The Toshi–Jutaku—Apr. 1972.
Domus—Apr. 1969.
Domus—Oct. 1968.

*Primary Examiner*—Carl D. Friedman
*Assistant Examiner*—Christopher Todd Kent
*Attorney, Agent, or Firm*—Harness, Dickey & Pierce, P.L.C.

[57] ABSTRACT

A design and construction module comprised of nine cells each having substantially equal lengths, widths and heights and longitudinally opposed ends. Two of the cells form the base of the module and are located side-by-side with their ends terminating adjacent and flush with one another. Three of the cells form an intermediate level of cells located above the base cells. Two of these intermediate cells correspond with the two base cells and are located immediately thereabove, but longitudinally offset. In this way these two intermediate cells extend a predetermined distance beyond the one end of the base cells in an overhang. Opposite the overhang, the third cell of the intermediate cells extends transversely with respect to the two other intermediate cells and the base cells. A portion of the third intermediate cell therefore laterally extends beyond the side of the base cells. Three additional cells define a common top surface of the module. The three top cells are each positioned directly above one of the intermediate cells. A final cell extends perpendicular to the base, intermediate and top cells. With the above construction, the module of this invention is adapted for interlocking engagement with one or more additional modules to aid in the designing and construction of various structures including terrestrial, marine and aeronautical structures.

20 Claims, 5 Drawing Sheets

_Fig - 5_

_Fig - 6_

DESIGN AND CONSTRUCTION MODULE

BACKGROUND OF THE INVENTION

1. Field of the Invention

The present invention relates to a three dimensional design and modular construction module. More particularly, the module of the present invention is adapted for use in the design, construction and assembly of residential buildings, commercial buildings, marine based structures, aerospace structures as well as furniture, playground equipment and erector or building block sets. The concept of the invention could also be incorporated into computer software intended for designing the same types of structures. While the above is a relatively detailed listing of possible applications for the present invention, as will become apparent from the discussion below, additional and alternative applications will become readily apparent to those skilled in the art. Accordingly, the present invention is not intended to be limited or bound by the applications mentioned above.

2. Description of the Prior Art

It is well known that numerous design professions utilize models in the design process. Often, these models take the form of a building, industrial articles and other structures. Such models or mockups are used by architects to investigate the aesthetic values of certain building configurations, profiles or elevations. Models are also used by industrial designers in evaluating the potential of various industrial articles such as furniture. Interior designers and artists often use various models to illustrate general concepts to prospective customers prior to actual creation of the commissioned work. Additionally, children enjoy utilizing blocks to construct their own buildings, vehicles, furniture and other articles during play and constructive endeavors.

To permit the above, numerous varieties of design elements, blocks or modules have been proposed. Often the modules are provided as a simple building block with appropriately positioned grooves or cut-outs that will enable one block to be interlocked with a similar or different type or shape of block having complimentary features. Most often these are used to build walls not models of overall building or structures. An example of one such interlocking modular design block is disclosed in U.S. Pat. No. 3,546,792 and issued to Sherman. Some of these blocks actually snap together in a positive engagement while others rely on nesting with adjacent blocks to form a stable structure.

Taking the modular design block one step further, modular building structures and systems have been proposed where a plurality of prebuilt modules or box-like units are stacked to form successive stories of a building. These units include features which allow for interconnecting of the units and provide service access for the necessary wiring, plumbing and ventilation systems needed by the additional or adjacent units. Typically, in these modular building structures, the individual units are prebuilt boxes whose interiors can be subdivided to form different and varying work or living spaces. Some prior designs have utilized sections or angled surfaces to permit the units to directly engage one another in a systematic fashion. One such modular building structure is illustrated in U.S. Pat. No. 3,643,390, issued to Shelley.

While the above design modules facilitate the visualization and evaluation of proposed designs, frequently they only present limited possibilities for experimentation and, in many instances, the results leave much to be desired with respect to actual visualization of a completed structure after a laborious process for creating the desired building.

In view of the foregoing limitations and shortcomings of the prior technology, as well as other disadvantages not specifically mentioned above, it should be apparent that there still exists a need in the field of architectural and industrial design for an improved design module which can be utilized and combined with additional modules to permit the erection and construction of many different types and sizes of buildings or other structures, the possibilities of which are limited only by the imagination of the designer and the number of modules available.

It is therefore a primary object of this invention to fulfill that need by providing a three dimensional design element or module which is distinctively shaped such that it can be combined and/or nested with additional modules in an endless number of different patterns.

Another object of the present invention is to provide a design and construction module which exhibits different elevational views or profiles when rotated about various axes with each profile offering another potential construction or structure.

A further object of this invention is to provide a design and construction module which is capable of being combined and/or nested with multiple numbers of the same module, or with modules exhibiting an opposite hand, and positioned adjacent to and/or above in different arrangements and combinations to create a variety of structures ranging in size and visual appearance.

It is another object of the present invention to provide a design and construction module composed of nine elements or cells which (1) interact and combine to form a module that is stable when standing alone or combined with other modules, and (2) can be shipped or transported in component form to construction sites to form complete or partial modules.

An additional object of the present invention is to provide a design and construction module which can be rotated about a horizontal center axis so as to manifest different profile and elevational views at each 90° increment of rotation.

Yet another object of the present invention is to provide a module made up of individual cells each of which exhibits a common dimensional relationship with respect to its height, width and length. Accordingly, a feature of the present invention is that the width and height of each individual cell is substantially the same and approximately one third (⅓) of the length of each cell.

SUMMARY OF THE INVENTION

Briefly described, these and other objects are accomplished according to the present invention by providing an interlockable or nestable design and construction module which includes a body composed of nine elements or cells. These nine cells are interrelated and positioned relative to one another in a predetermined manner so as to form the basic module itself and to also permit sequential placement of cells to form a partial module, which can be completed at a later date, if necessary, to satisfy economic constraints.

The basic module includes nine rectangular cells. Each cell can be considered to be composed of three identical cubes, with each cube correlating to one unit of measure. Accordingly, the parallel planes of each cell, and module, are equal in every respect, expanding and contracting with one another at the same rate and direction depending on the unit of measure.

The unit of measure for the entire basic module, when stacked or placed beside one another, also responds in the same manner. An exception to this rule would be an arrangement where two modules of identical height are stacked and abut a third module whose overall height totals that of the stacked modules. In this instance, the unit of measure for the stacked modules will be ½ that of the abutting module.

While the module is capable of being rotated about either its X or Y axes, in its "home" or "F" profile (so designed because the top surface of the module resembles the letter F), two cells are provided in longitudinal side-by-side relation to one another to form a base level of the module. Two intermediate cells are located above the base cells in a middle level and are longitudinally aligned with the base cells, but axially offset such that these two intermediate cells form an overhang with respect to one end of the base cells. A third intermediate cell is positioned opposite the overhang and oriented transversely with respect to the base cells to also form a lateral overhang. Three top cells in a top level are correspondingly positioned with the three intermediate cells. A final cell is vertically oriented with respect to the other cells and is located so that one of its side walls forms a common plane with those ends of the base cells immediately beneath the overhang formed by the longitudinally oriented intermediate cells. The opposite side of this vertical cell is therefore spaced apart one unit from the lateral overhang defined by the transversely oriented intermediate and top cells. This results in a groove or channel being defined therebetween. Accordingly, the final cell forms the middle leg of the "F" profile.

The module is adapted such that the overhangs and channels of one module can be nested or interlocked with another module of either the same or opposite hand. Additionally, modules can be stacked upon or located adjacent to one another in the same orientation or rotated in increments of 90° about the X and Y axes of the module. By adding various roof lines to the uppermost modules of a set of combined modules, it can be seen that a multiplicity of different structures, varying in size, complexity and elevation, can be constructed and that the number of different possible configurations is limited only by the number of modules added to the existing design. Additional modules can also be added without compromising the structural integrity of design to which they are being added.

When used for modular construction of an actual building, the structural integrity of the building is ensured since none of the overhangs of the module extend greater than one third (⅓) the over length of a cell beyond the end of the cell located immediately therebelow. Notably, whenever the module is rotated about one of the two designated axes and at 90° increments, at least one of the cells will be positioned with a vertically extending orientation. Accordingly, the design and construction module of this invention always presents a vertical access shaft which can operate as either a service, stairwell or elevator shaft, between successive floors of the structure.

The basic configuration of the individual cells can be varied between a rectangular box-like shape, a cylindrical shape and a semi-elliptical shape. The semi-elliptical shape would combine with an adjacent and similar semi-elliptical shape cell to form a composite oval cell. These different individual cell configurations could be combined together in a single module further providing additional design capabilities. Additionally, the module itself and the individual cells can be expanded, stretched or contracted and compressed to provide the module with additional design configurations. If expanded or compressed, the length to width ratio of each individual cell should be maintained to ensure the structural integrity of the resulting module or design structure and the ability to properly interlock with an adjacent module.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
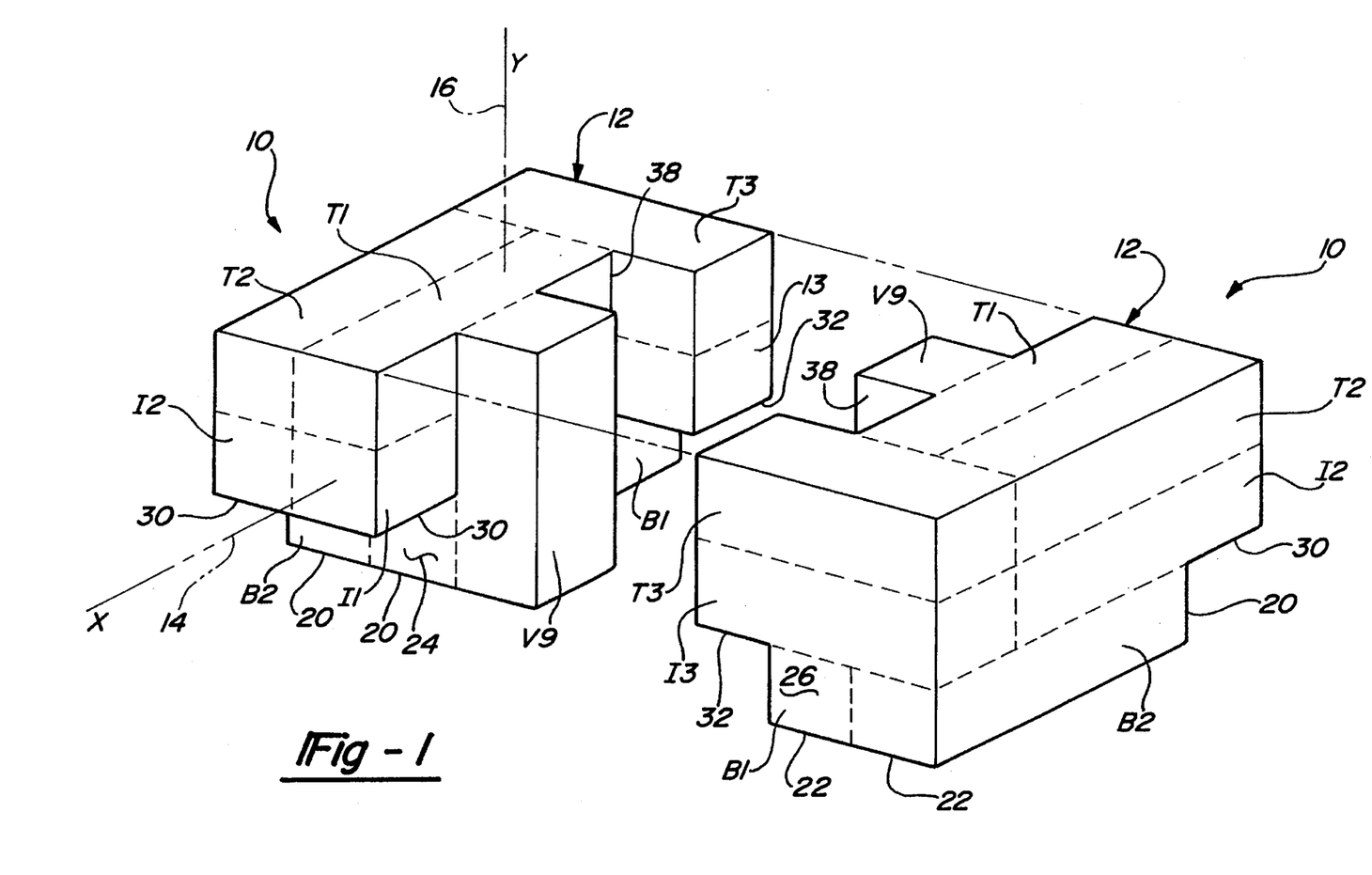
FIG. 1 is an exploded perspective view of two design modules according to the principles of the present invention in which one module is rotated 180° about a vertical or Y-axis from the other module and showing one possible interrelated positioning of the modules.

Referring now in detail to the drawings, there is shown in FIG. 1 two design and construction modules embodying the principles of the present invention and generally designated at 10. The module 10 is a three dimensional body 12 having various features (such as overhangs, undercuts, channels and grooves) which allow it to interconnect and nest with other modules 10 of the same or opposite hand. As seen in FIG. 1, the module 10 to the left is illustrated in its "home" of "F" 1. This profile is so designated and can be easily recognized by the shape of the letter F which is formed by the top surface of the module 10 in this position.

The module 10 is capable of exhibiting numerous different profiles or elevational configurations by rotating it in 90° increments about either of two axes which are generally designated as the X-axis 14 and the Y-axis 16. As seen in FIG. 1, the module 10 to the right of the figure has been rotated approximately 180° about the Y-axis 16 relative to the module 10 illustrated to the left in the figure.

As best seen in FIG. 1, the module 10 is made up of nine identically shaped cells. In one preferred embodiment, the cells are generally rectangular and box-like in shape such that they exhibit a length which is three times their width and height. While additional configurations for the cells themselves are possible and further discussed below, for the sake of clarity the rectangular box-like shape is being herein described with the most specificity. It is believed that after the discussion with respect to the rectangular box-like cells, the additional possible shapes for the cells will be more easily appreciated by one skilled in the art.

In its F-profile and home position, eight of the nine cells comprising the module 10 are oriented so as to generally extend within three parallel, horizontal planes. Accordingly, the module 10 is provided with three levels or stories. Two cells form the base, hereinafter base cells B1 and B2 of the module 10 in the F-profile. The base cells B1 and B2 are oriented so that their longitudinal axes are substantially parallel to the X-axes 14 and are located in adjacent side-by-side relation to one another. Base cells B1 and B2 accordingly include first ends 20 and second ends 22. The base cells B1 and B2 are positioned adjacent to one another such that the first end 20 of one base cell B1 is flush and corresponds with the first end 20 of the other base cell B2 to form a surface defining a common first plane 24. Similarly, the second ends 22 of the base cells B1 and B2 are flush and coincidental with one another so as to define a second common plane 26 which defines one end of the module 10.

Located above each base cell B1 and B2 and longitudinally staggered with respect thereto are two intermediate cells I1 and I2. The intermediate cells I1 and I2 are longitudinally staggered with respect to the base cells B1 and B2 so that a portion of the intermediate cells I1 and I2 forms an overhang 30 beyond the first common plane 24 and first ends 20 of the base cells B1 and B2. The depth of the overhang 30 corresponds to the width of the cells and is therefore only one-third of the overall length of the intermediate cells I1 and I2. This ensures the structural integrity of the structure being designed through the utilization of the module 10.

A transversely oriented intermediate cell I3 is located in the intermediate story longitudinally opposite of the overhang 30. The transverse intermediate cell I3 laterally extends across the two base cells B1 and B2, generally opposite of the overhang 30, and, accordingly, one-third of the length of the transverse intermediate cell I3 defines a lateral overhang 32 off to one side of the base cells B1 and B2. Again, the lateral overhang 32 corresponds to the width of one cell and is therefore approximately one-third of the length of the transverse intermediate cell I3. Additionally, the outboard side of the transverse intermediate cell I3 corresponds to and is flush with the second ends 22 of the base cells B1 and B2 and lies in the second common plane 26.

The top story of the module 10 is a repeat of the intermediate story. The top story therefore similarly includes a pair of side-by-side top cells T1 and T2 which have longitudinal axes that are parallel to the X-axis 14 and a transverse top cell T3 extends laterally with respect to the longitudinal top cells T1 and T2. The top story therefore is located immediately above the intermediate story so as to substantially correspond with the intermediate story and define a common perimeter.

The ninth and final cell of the module 10 is positioned so that its longitudinal axes is parallel to the Y-axis 16 and is herein referred to as vertical cell V9. When properly located with respect to the remaining cells, the vertical cell V9 has one end or surface which cooperates with the uppermost surfaces of the top cells T1–3 to define the top surface 38 of the module 10. Similarly, the lower end of the vertical cell V9 corresponds with the bottom sides of the base cells B1 and B2 to define a bottom surface of the module 10. The vertical cell V9 is also located so that one longitudinal side of the vertical cell V9 is flush with and corresponds with the first common plane 24 defined by the first ends 20 of the base cells B1 and B2. The opposite longitudinal side of the vertical cell V9 is therefore spaced apart, the width of one cell, from those portions of the transverse intermediate cell I3 and the transverse top cell T3 which define the lateral overhang 32 forming a channel between them.

Figure 2:
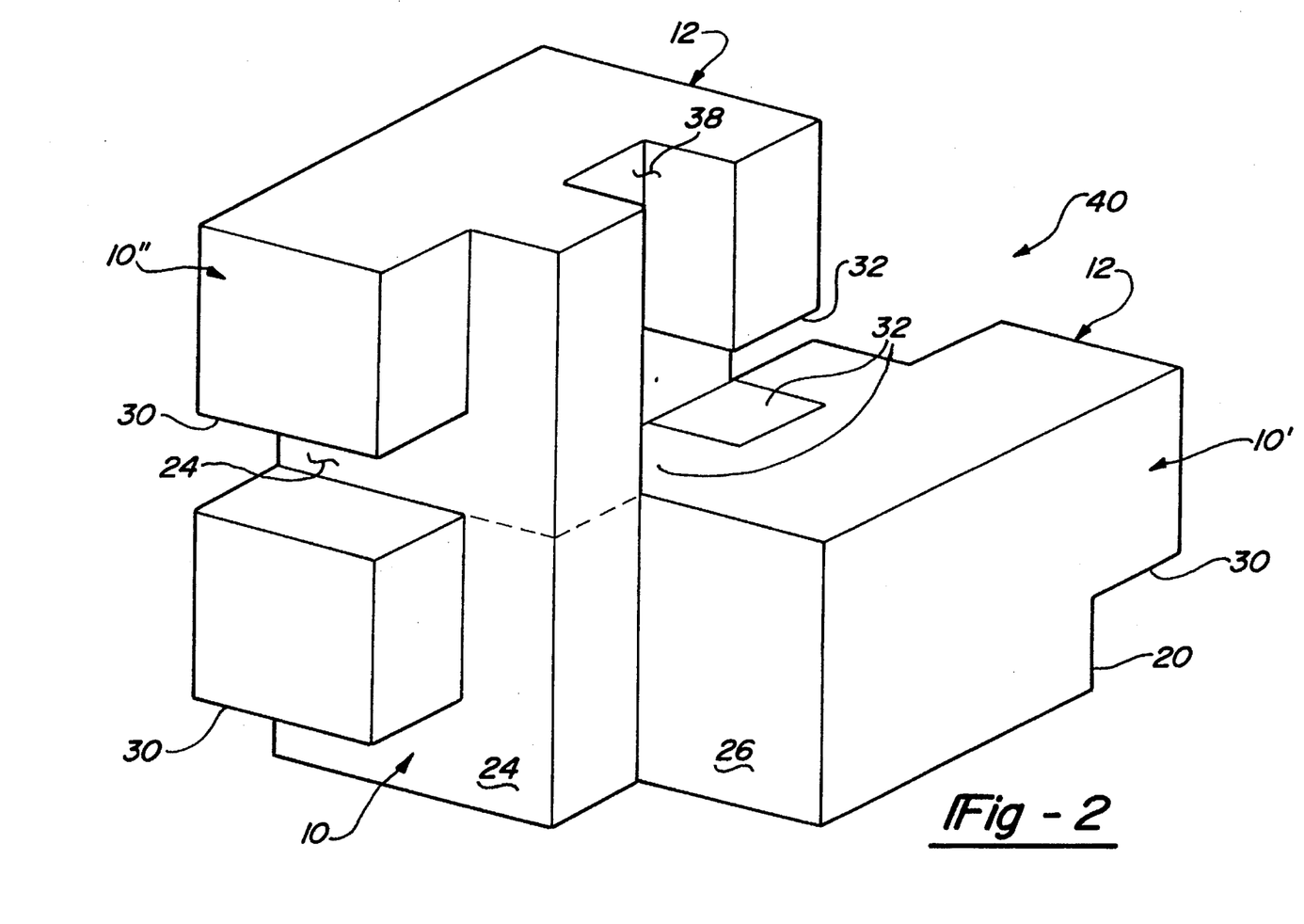
FIG. 2 is a perspective view of three design construction modules according to the principles of the present invention in which two modules have been interconnected and a third module has been stacked thereupon.

As suggested by FIG. 1 and illustrated in FIG. 2, two or more modules 10 can be interconnected, nested or stacked with respect to one another so as to enable the mockup of a proposed design and thereby allowing its visual impression to be evaluated and appreciated. As suggested in FIG. 1, two modules 10 rotated 180° about the Y-axis 16 relative to one another, can be engaged such that the two lower legs of the "F" defined by the vertical cells V9 are located within the channels 38 on the opposing module 10 with the upper legs of the "F" or lateral overhangs 32 forming outboard portions of the resulting structure. In such a resulting structure, it can easily be envisioned that the vertical cells V9 located in the center of the structure would operate as the elevator shaft, stairwell and service shaft for the various electrical, ventilation and telephone systems of a building. Moreover, the base cells B1 and B2, intermediate cells I1–3 as well as the top cells T1–3 could be subdivided into multiple rooms and hallways as needed with each of the stories corresponding to one story of the resulting structure or building. By merely altering the roof line of the structure and adding in windows in various locates, it can be seen that a building is now easily envisioned and illustrated. This is further illustrated in FIGS. 2 and 3.

Figure 3:
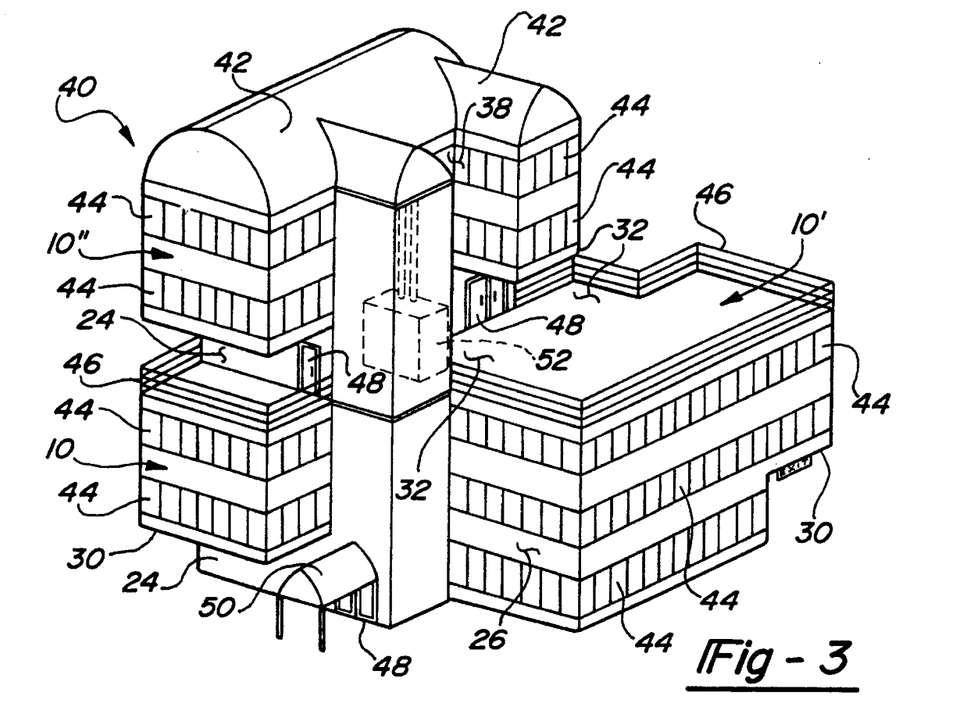
FIG. 3 illustrates a building mockup of the three interconnected modules shown in FIG. 2 with roof lines, windows and balcony railings added thereto.

In FIG. 2, three modules are utilized to workup the mock building structure 40 shown in greater detail seen in FIG. 3. As seen in FIG. 2, the modules 10' to the right of FIG. 1 has been shifted along the X-axis 14 a distance which corresponds with two widths of a cell and then engaged with the opposing module 10 so that the lateral overhangs 32 of the right module 10' is located within the channel 38 of the other module 10. Additionally, a third module 10" has been stacked upon the first module 10 in an identical orientation. This vertically expands the height of the resulting structure 40.

As seen in FIG. 3, by incorporating alternative roof lines 42, windows 44 and other structures such as balcony railings 46, doors 48, awnings 50 and elevators 52, a workup of a building 40 is easily created. In practice, merely adding a roof line to the structure defined by the multiple modules 10 allows one experienced in architectural design to visually interpret and evaluate the aesthetics of the resulting building.

Figure 4:
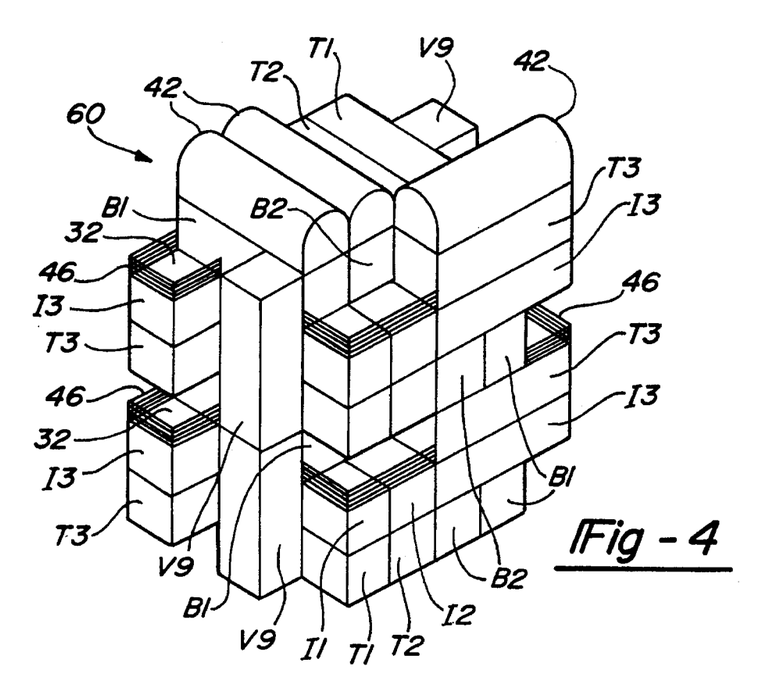
FIG. 4 is another building mockup in which four design modules according to the present invention have been utilized.

This is further evident from FIG. 4 where four modules 10 have been utilized to create a mock building 60 of greater complexity.

The model 60 is constructed from four modules 10 which have been variously rotated about the X and Y-axes 14 and 16 and stacked upon one another to produce the resulting structure. The front two modules 10 are respectively provided with the same orientation and stacked upon one another. Accordingly, the front modules of FIG. 1 are rotated 180° about the X-axis and 90° about the Y-axis in a counterclockwise direction. The two rear modules 10 are opposite handed modules provided in the "reverse" profile and rotated clockwise 90°.

Figure 5:
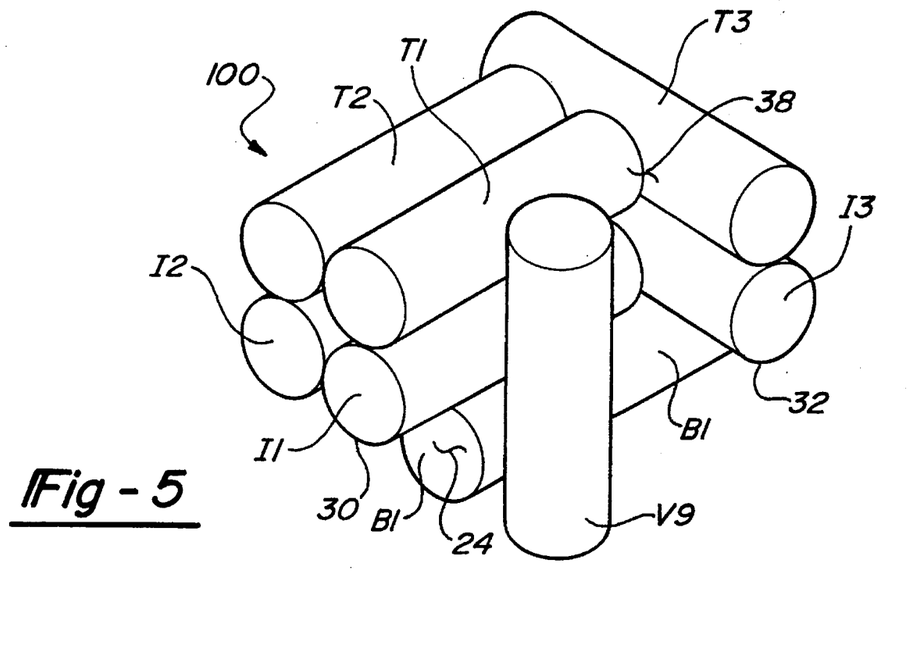
FIG. 5 is a perspective view of another embodiment of the design module according to the principles of the present invention when constructed from cylindrical cells.
Figure 6:
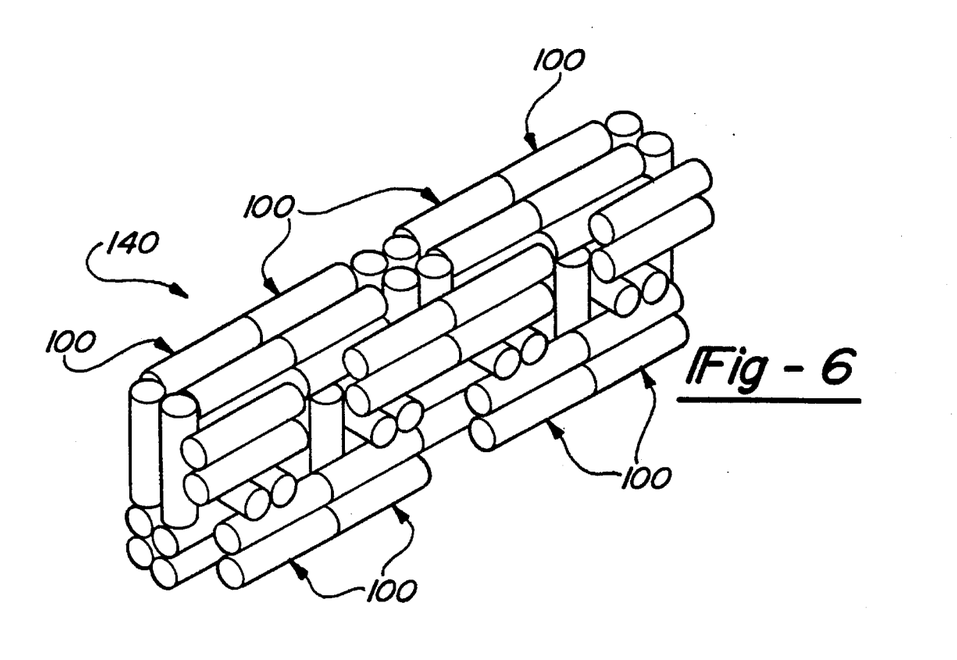
FIG. 6 is an aerospace mockup in which the design and construction module according to the principles of the present invention is constructed from cylindrical cells.

Referring now to FIG. 5, a module 100 is illustrated where each of the individual cells is provided with a cylindrical shape as opposed to the previously illustrated box-like rectangular shape. Similar to the prior cells, the diameter of each cell in FIG. 5 is one-third of the length of the cell. The module 100 is also provided in its F-profile and similarly located cells are designated with similar designations. In FIG. 6, an aerospace structure 140 is generally illustrated as being designed from a multiple number of the modules 100 illustrated in FIG. 5. Obviously, some of the modules 100 of the structure 140 have been rotated about their various axes and/or provided with opposite handedness to achieve the illustrated structure. The cylindrical nature of the individual cells is believed to offer a viable cell configuration which is readily applicable to aerospace uses. For example, it is well known that cylindrical structures lend themselves to incorporation as air filled, support structures which offers a high degree of structural integrity and ease of transportation within space vessels such as single use rockets and multiple use orbital crafts such as the N.A.S.A. space shuttle. The cylindrical structures could also be formed with a two layered exterior which is either inflated with air or filled with structural foam insulation.

Figure 7:
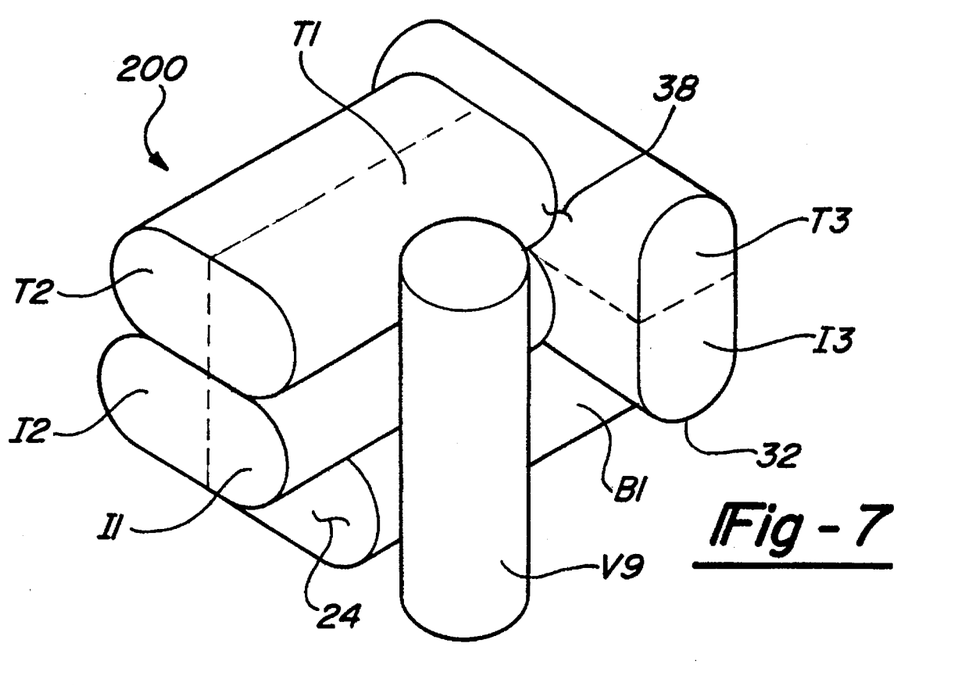
FIG. 7 is a perspective view of a third embodiment of the design module according to the present invention where semi-elliptical cells have been utilized to a module comprised of generally oval composite cells.

A third embodiment of a module incorporating the principles of the present invention is generally illustrated in FIG. 7 and designated at 200. In this third embodiment, the majority of the cells are provided with a semi-elliptical or hemispherical construction which allows them to be joined with an immediately adjacent cell to form a cylindrical or oval structure. Additionally, some of the cells in the intermediate and top stories can be joined with either an adjacent cell in the same story or a vertically adjacent cell of the adjacent story. As with the prior embodiments, the various corresponding cells are being designated with like references for the sake and clarity and the ease of understanding.

Figure 8:
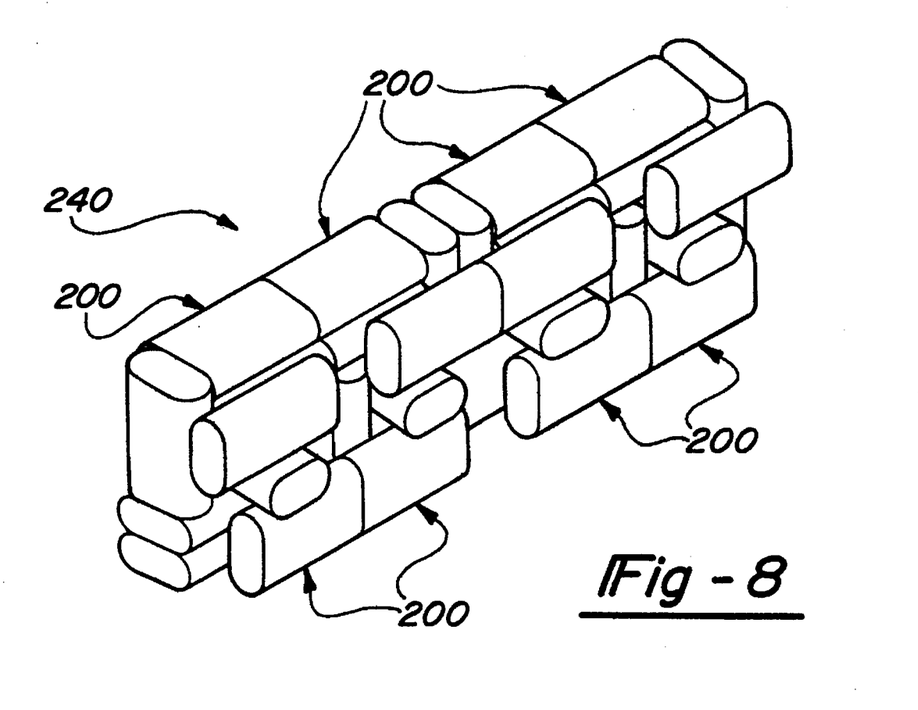
FIG. 8 is a mockup using multiple members of the module seen in FIG. 7.

A structure 240 is illustrated in FIG. 8 and constructed from a multiple number of modules 200 as seen in FIG. 7. The oval shape of the composite cells provides the resulting structure 240 with a more modern or contemporary appearance which certain individuals and/or cultures might find more pleasing than the rectangular box-shape cells or the cylindrical cells mentioned previously. It should be understood, however, that each of the cell shapes could be utilized in all facets and applications of the present invention and that none of the specific shapes are restricted to a give application.

Illustrated herein, it should be understood that the module 10 can be elongated along the Y-axis so long as the length and width of the individual cells is correspondingly stretched to maintain the desired dimensional relationships which will permit one module 10 to interact with another module 10 which has been similarly stretched or elongated.

When actually constructing a building, the module concept of the present invention can be utilized by first constructing nine individual cells and assembling the individual cells relative to one another in a modular fashion to form a resulting building. Accordingly, there is no specific need to locate one individual cell in a specific location since all of the cells are interchangeable and the only systematic procedure which needs to be followed is maintaining the integrity of the nine cell module. However, in actuality, it would be possible to eliminate certain individual cells (such as the top story) to further alter the resulting building. Since when properly presented, the module 10 will always have a vertical cell regardless of its rotation about the various axes, any resulting structure can utilize these vertical cells as service shafts, stairwells or elevator shafts in the resulting building. As with the design module mentioned previously, the dimensional relationships of the individual cells ensure that structural integrity is maintained throughout the resulting building. Further, the building can be expanded with future additions without disturbing the integrity of the prior structure. Once a story of cells has been completed, the interior walls dividing the cells can be modified to expand and alter the floor space of each story so as to provide for hallway and work spaces. This is similarly true in aeronautical and marine based applications where it would only be feasible to transport the individual cells separate form one another and later combine them to form the module structure.

In building construction, prefabrication and/or conventional construction techniques can be employed. The former may prove more economical, efficient and consistent from a quality control standpoint because premanufactured or precut structural and panel components can be easily and consistently mass produced to bear the same length, size, profile and finish. The same principle applies to cells or modules whose length to width or length to height ratios have been expanded or condensed. The proportions of the basic module allow for structural column/beam positions which are predetermined. These structural components follow uninterrupted through the entire module and also correspond with similar structural components of adjacent modules.

When the basic module described above is stretched, either longitudinally, transversely, vertically or concurrently in all of the aforementioned directions, all of the beam and column locations remain proportionally positioned relative to one another when the module or cells are elongated. This basic relationship and corresponding expansion or contraction also applies to the situation where more than one module is stacked above another module. By manipulating the dimensions of the lowermost module, the modules located thereabove will also correspondingly be manipulated and the relationship between the column and beam position of one module relative to the other will remain unchanged.

The vertical shafts of structures built according to the principles of the present invention can also incorporate vertical columns or frames of a height greater than the module itself. This allows the columns to be used as part of a construction tower or crane, built up on the upper portion of the structure, allowing for occupation of the lower portion of the building with ongoing construction of the upper portion of the building. The column can also be provided for a "suspended" portion of a building between two structures composed of the modules.

While the above description constitutes the preferred embodiment of the present invention, it will be appreciated that the invention is susceptible to modification, variation and change without departing from the proper scope and fair meaning of the accompanying claims.

I claim:

1. An interlockable design and construction module comprising:

nine members of substantially equal length, width and height, said members having longitudinally opposed first and second ends;

two of said members forming base members located in side-by-side relation to one another such that said first ends of said base members terminate adjacent to one another and flush with one another to define a first common plane, said second ends of said base members terminating adjacent to one another and flush with one another to define a second common plane;

three of said members forming intermediate members and located above said base members, two of said intermediate members corresponding with said base members and being located immediately thereabove and longitudinally offset from said base members such that said two of said intermediate members extend a predetermined distance beyond said first ends of said base members forming a longitudinal overhang, said third one of said intermediate members extending transversely with respect to said two other intermediate members and said base members, a portion of said third one of said intermediate members extending beyond a lateral side of one of said base members and forming a lateral overhang with respect thereto and having a side, said third one of said intermediate member having a side surface formed flush with said second common plane defined by said base members;

three of said members forming top members which cooperate to define a common top surface of said model, one each of said top members being positioned substantially directly above one of said intermediate members so as to directly correspond therewith; and a final member extending along an axis perpendicular to planes defined by said base, intermediate and top members, said final member being located with a portion of a side surface coincidental and flush with said common plane defined by said first ends of said base members, said final member being spaced apart from said lateral overhang defined by said third ones of said intermediate and top members a distance corresponding to the width of said final member and generally defining a channel therebetween, said final member also having a pair of ends, one of said ends of said final member being coincidental and flush with said top surface defined by said top members, the other of said ends being coincidental and flush with said bottom surface defined by said base members, whereby said module is adapted for interlocking engagement with one or more additional modules to enable the designing and construction of various structures including terrestrial, marine and aeronautical structures.

2. A design and construction module as set forth in claim 1 wherein all of said members are substantially identical in shape.

3. A design and construction module as set forth in claim 2 wherein said members are rectangular and box-like in shape.

4. A design and construction module as set forth in claim 3 wherein said members have a length which is approximately three times greater than the width of said members.

5. A design and construction module as set forth in claim 3 wherein said members have a length which is approximately three times greater than the height of said members.

6. A design and construction module as set forth in claim 2 wherein said members are cylindrical in shape.

7. A design and construction module as set forth in claim 6 wherein said members exhibit a length which is approximately three times greater than the diameter of said members.

8. A design and construction module as set forth in claim 1 wherein at least some of said members exhibit shapes different from one another.

9. A design and construction module as set forth in claim 1 wherein at least some of said members are semi-ellipsoidal in cross sectional shape.

10. A design and construction module as set forth in claim 9 wherein said base members cooperate with one another to form a generally oval composite member.

11. A design and construction module as set forth in claim 9 wherein at least two of said intermediate members cooperate with one another to form a generally oval composite member.

12. A design and construction module as set forth in claim 9 wherein at least two of said intermediate members cooperate with one another to form a generally oval composite member.

13. A design and construction module as set forth in claim 1 wherein said base, intermediate and top members are generally semi-ellipsoidal in cross section with bases of said semi-ellipsoidal members being substantially adjacent to bases of another one of said semi-ellipsoidal members so as to thereby form oval composite members above said intermediate members to cooperate with one another to form a generally oval composite members.

14. A design and construction module as set forth in claim 9 wherein at least one of said intermediate members cooperates with at least one of said top members to form a generally oval composite member.

15. A design and construction module as set forth in claim 1 wherein said members are individually formed and secured together to form said module.

16. A design and construction module as set forth in claim 1 wherein said members are integrally formed with one another.

17. A design and construction module as set forth in claim 1 wherein said members are unitarily formed with one another.

18. A design and construction module as set forth in claim 1 wherein a plurality of said modules are used according to a method comprising the following steps:

selecting a first module and positioning said first module in a predetermined orientation; and selecting at least one additional module and locating said module adjacent to said first module so as to construct a desired structure.

19. A design and construction module as set forth in claim 18 wherein said additional module is nested with said first module.

20. A design and construction module as set forth in claim 18 wherein said first and said additional module are constructed by individually positioning said members to form said modules.

* * * * *

UNITED STATES PATENT AND TRADEMARK OFFICE
CERTIFICATE OF CORRECTION

PATENT NO. : 5,575,120
DATED : November 19, 1996
INVENTOR(S) : Frederick G. Handley It is certified that error appears in the above-indentified patent and that said Letters Patent is hereby corrected as shown below:

In column 9, line 24, Claim 1, after "said" delete "model" and insert ---module---.

In column 10, line 51, Claim 18, insert ---additional--- at the beginning.

Signed and Sealed this

Twenty-ninth Day of July, 1997

*Attest:*

BRUCE LEHMAN

*Attesting Officer*  *Commissioner of Patents and Trademarks*